(12) United States Patent
Nishiyama et al.

(10) Patent No.: US 10,101,069 B2
(45) Date of Patent: Oct. 16, 2018

(54) REFRIGERATION CYCLE APPARATUS

(71) Applicants: Mitsubishi Electric Corporation, Tokyo (JP); Asahi Glass Company, Limited, Tokyo (JP)

(72) Inventors: Takumi Nishiyama, Tokyo (JP); Takashi Okazaki, Tokyo (JP); Shigeyoshi Matsui, Tokyo (JP); Akira Ishibashi, Tokyo (JP); Shinya Higashiiue, Tokyo (JP); Yuki Ugajin, Tokyo (JP); Daisuke Ito, Tokyo (JP)

(73) Assignees: Mitsubishi Electric Corporation, Tokyo (JP); Asahi Glass Company, Limited, Tokyo (JP)

( * ) Notice: Subject to any disclaimer, the term of this patent is extended or adjusted under 35 U.S.C. 154(b) by 63 days.

(21) Appl. No.: 15/124,373

(22) PCT Filed: Mar. 17, 2014

(86) PCT No.: PCT/JP2014/057046
§ 371 (c)(1),
(2) Date: Sep. 8, 2016

(87) PCT Pub. No.: WO2015/140884
PCT Pub. Date: Sep. 24, 2015

(65) Prior Publication Data
US 2017/0016660 A1    Jan. 19, 2017

(51) Int. Cl.
*F25B 49/02* (2006.01)
*F25B 9/00* (2006.01)
(Continued)

(52) U.S. Cl.
CPC .............. *F25B 49/02* (2013.01); *C09K 5/045* (2013.01); *F25B 9/006* (2013.01); *F25B 40/00* (2013.01);
(Continued)

(58) Field of Classification Search
CPC ...... F25B 41/04; F25B 49/02; F25B 2400/01; F25B 2400/051; F25B 2400/23;
(Continued)

(56) References Cited

U.S. PATENT DOCUMENTS

2003/0089493 A1* 5/2003 Takano .............. B60H 1/00914
165/202
2011/0000240 A1* 1/2011 Yamada ................ F25B 49/005
62/208

(Continued)

FOREIGN PATENT DOCUMENTS

CN           103562338 A    2/2014
JP           S53-110545 U   9/1978
(Continued)

OTHER PUBLICATIONS

International Search Report of the International Searching Authority dated Jun. 17, 2014 for the corresponding international application No. PCT/JP2014/057046 (and English translation).
(Continued)

*Primary Examiner* — Marc Norman
(74) *Attorney, Agent, or Firm* — Posz Law Group, PLC (57) ABSTRACT

A refrigeration cycle apparatus avoids refrigerant conditions causing a disproportionation reaction and exhibit high performance with safety even when a refrigerant causing the disproportionation reaction is used in a zeotropic refrigerant mixture. The refrigeration cycle apparatus uses, as a working refrigerant, the zeotropic refrigerant mixture of a first refrigerant and a second refrigerant having a higher boiling point than that of the first refrigerant under the same pressure, and includes at least a main passage sequentially connecting a compressor, a first heat exchanger, an expansion valve, a gas-liquid separator, and a second heat exchanger. The first refrigerant causes the disproportionation reaction. In an initial state after startup of the com-
(Continued)

pressor, the refrigeration cycle apparatus performs an initial operation decreasing a temperature or a pressure of refrigerant discharged from the compressor to be lower than that in a normal operation based on an amount of liquid refrigerant in the gas-liquid separator.

17 Claims, 10 Drawing Sheets

(51) Int. Cl.
*F25B 41/00* (2006.01)
*F25B 40/00* (2006.01)
*F25B 41/04* (2006.01)
*C09K 5/04* (2006.01)

(52) U.S. Cl.
CPC ............ *F25B 41/04* (2013.01); *F25B 41/046* (2013.01); *C09K 2205/126* (2013.01); *C09K 2205/32* (2013.01); *F25B 2400/01* (2013.01); *F25B 2400/051* (2013.01); *F25B 2400/121* (2013.01); *F25B 2400/23* (2013.01); *F25B 2500/26* (2013.01); *F25B 2600/2507* (2013.01); *F25B 2700/04* (2013.01); *F25B 2700/2103* (2013.01)

(58) Field of Classification Search
CPC .......... F25B 2500/26; F25B 2600/2507; F25B 2700/04; F25B 2700/2103; C09K 5/045; C09K 2205/32; C09K 2205/126
See application file for complete search history.

(56) References Cited

U.S. PATENT DOCUMENTS

2012/0168672 A1* 7/2012 Nappa .................... C09K 5/045
252/67
2014/0070132 A1 3/2014 Fukushima

FOREIGN PATENT DOCUMENTS

| JP | S62-155472 A | 7/1987 |
| JP | H07-190515 A | 7/1995 |
| JP | H08-128746 A | 5/1996 |
| JP | H08-327185 A | 12/1996 |
| JP | H11-281208 A | 10/1999 |
| JP | 2001-027460 A | 1/2001 |
| JP | 2001-280731 A | 10/2001 |
| JP | 2002-295915 A | 10/2002 |
| JP | 2003-269806 A | 9/2003 |
| JP | 2010-156524 A | 7/2010 |
| JP | 2011-094964 A | 5/2011 |
| WO | 2012/157764 A1 | 11/2012 |
| WO | 2013/099147 A1 | 7/2013 |

OTHER PUBLICATIONS

Office Action dated Jun. 27, 2017 issued in corresponding JP application No. 2016-508344 (and English translation).
Extended European Search Report dated Nov. 15, 2017 in the corresponding EP application No. 14886214.7.
Office Action dated Mar. 29, 2017 issued in the corresponding AU application No. 2014387676.
Office Action dated Jan. 26, 2018 issued in corresponding CN patent application No. 201480077187.3 (and English translation).
Office Action dated Apr. 18, 2018 issued in corresponding KR patent application No. 10-2016-7027418 (and English translation).

* cited by examiner

INITIAL OPERATION

FIG. 5

NORMAL OPERATION

INITIAL OPERATION ⇐ REFRIGERANT FLOW

FIG. 12

NORMAL OPERATION ⇐ REFRIGERANT FLOW

REFRIGERATION CYCLE APPARATUS

CROSS REFERENCE TO RELATED APPLICATION

This application is a U.S. national stage application of PCT/JP2014/057046 filed on Mar. 17, 2014, the contents of which are incorporated herein by reference.

TECHNICAL FIELD

The present invention relates to a refrigeration cycle apparatus using a zeotropic refrigerant mixture as a working refrigerant.

BACKGROUND ART

In recent years, low GWP refrigerant has been developed to reduce the influence of global warming. Although R410A having been typically used exhibits good performance, its global warming potential (GWP) is about 2000. For this reason, R32 whose GWP is about ⅓ of the GWP of R410A has been increasingly used. Although R32 is a refrigerant having physical properties close to those of R410A and exhibiting good performance, the GWP of such refrigerant is about 600. For a lower GWP, fluoropropene-based (HFO-based) refrigerants such as HFO-1234yf have been developed.

However, such refrigerants are high boiling refrigerants, and exhibit low performance. For maintaining performance similar to that of the typical refrigerant, there is a probability of causing many technical issues and increasing the cost.

Thus, a refrigeration cycle apparatus has been proposed, which employs a refrigerant (e.g., HFO-1123) whose global warming potential is low and whose boiling point is low (see Patent Literature 1).

It has been known that HFO-1123 has less influence on the ozone layer because the composition of HFO-1123 contains no chlorine atom, and that HFO-1123 has less influence on global warming and exhibits excellent performance (capacity) because HFO-1123 has a double bond and a shorter life in atmosphere (i.e., HFO-1123 is a low boiling refrigerant). Moreover, HFO-1123 belongs to a category equivalent to rank 2 L (low flammability) of ASHRAE's flammability classification, achieving safety.

Refrigerants such as HC, HFC, HCFO, CFO, and HFO can be mixed with HFO-1123 so that a zeotropic refrigerant mixture partially having advantages of such refrigerants is formed.

It has been known that in a refrigeration cycle apparatus using such a zeotropic refrigerant mixture as a working refrigerant, the composition ratio of circulating refrigerant changes because excess refrigerant containing rich high boiling refrigerant is accumulated as liquid refrigerant in, e.g., an accumulator, and malfunction might be caused due to lowering of performance and an increase in high pressure (see Patent Literature 2).

CITATION LIST

Patent Literature

Patent Literature 1: WO2012/157764
Patent Literature 2: Japanese Unexamined Patent Application Publication No. 2002-295915

SUMMARY OF INVENTION

Technical Problem

Although HFO-1123 ($CF_2$=CHF) is a refrigerant with excellent performance as described above, it has been known that HFO-1123 causes a disproportionation reaction (autolytic reaction) under particular conditions. The disproportionation reaction a is chemical reaction in which two or more molecules of the same type react with each other to generate two or more different types of products.

The disproportionation reaction of HFO-1123 is the following chemical reaction:

$$CF_2=CHF \rightarrow (½)CF_4+(3/2)C+HF+(\text{heat of reaction})$$

Such reaction is caused in such a manner that energy is locally applied to the refrigerant. Moreover, there is an issue that chain reaction might be caused under high-temperature high-pressure environment.

For reducing such a disproportionation reaction, HFO-1123 is not used alone, but may be used as one component of a zeotropic refrigerant mixture with a low composition ratio of HFO-1123. However, when excess refrigerant containing rich high boiling refrigerant is accumulated as liquid refrigerant in, e.g., an accumulator as described above, HFO-1123 as a low boiling refrigerant is present in a high composition ratio in a refrigerant circuit, leading to an issue that there is a higher probability of causing the above-described disproportionation reaction under high-temperature high-pressure conditions.

The present invention has been made to solve the above-described issues, and is intended to provide a refrigeration cycle apparatus configured to avoid refrigerant conditions causing a disproportionation reaction and exhibit high performance with safety even when a refrigerant causing the disproportionation reaction is used as one component of a zeotropic refrigerant mixture in the refrigeration cycle apparatus.

Solution to Problem

A refrigeration cycle apparatus of an embodiment of the present invention uses, as a working refrigerant, a zeotropic refrigerant mixture of a first refrigerant and a second refrigerant having a higher boiling point than that of the first refrigerant under the same pressure. The refrigeration cycle apparatus includes at least a main passage sequentially connecting a compressor, a first heat exchanger, an expansion valve, a gas-liquid separator, and a second heat exchanger. The first refrigerant causes a disproportionation reaction. In an initial state after startup of the compressor, the refrigeration cycle apparatus is configured to perform an initial operation decreasing a temperature or a pressure of refrigerant discharged from the compressor to be lower than that in a normal operation based on an amount of liquid refrigerant in the gas-liquid separator.

Advantageous Effects of Invention

According to the refrigeration cycle apparatus of an embodiment of the present invention, a high-performance refrigeration cycle apparatus can be realized, which is configured so that the composition ratio between the first and second refrigerants in a cycle can be properly and quickly improved from the state of accumulating liquid refrigerant in an accumulator immediately after startup of the compressor and that a disproportionation reaction can be reduced by lowering of the partial pressure of the first refrigerant in the refrigeration cycle.

DESCRIPTION OF EMBODIMENTS

Embodiments of the present invention will be described below with reference to drawings.

Note that the configuration etc. described below will be set forth as an example, and a refrigeration cycle apparatus of the present invention is not limited to such a configuration etc.

Moreover, as necessary, a detailed structure will be simply illustrated or will not be illustrated.

Further, as necessary, overlapping or similar description will be simply made or will not be made.

First Embodiment

First, the configuration of a refrigeration cycle apparatus of a first embodiment will be described.

Figure 1:
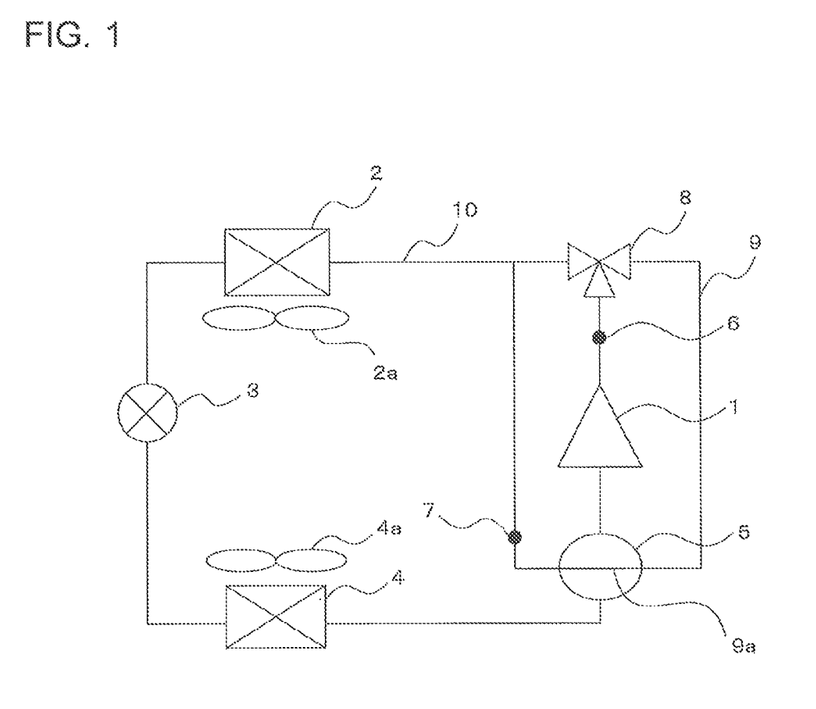
FIG. 1 is a schematic configuration diagram of a refrigeration cycle apparatus of a first embodiment.

FIG. 1 is a schematic configuration diagram of the refrigeration cycle apparatus of the first embodiment.

As illustrated in FIG. 1, the refrigeration cycle apparatus of the first embodiment includes a main passage 10 where a compressor 1, a condenser 2, an expansion valve 3, an evaporator 4, and an accumulator 5 (equivalent to a gas-liquid separator of the present invention) are sequentially connected together. Such a refrigeration cycle apparatus further includes a bypass 9 branched from a discharge side of the compressor 1 of the main passage 10, passing through the accumulator 5 by way of a three-way valve 8, and connected to an inlet side of the condenser 2 of the main passage 10. These components are connected together through refrigerant pipes.

The bypass 9 is further provided with a heat exchanger 9a between the bypass 9 and the accumulator 5, and a first temperature detection unit 6 and a second temperature detection unit 7 are provided to sandwich the heat exchanger 9a. The first temperature detection unit 6 is configured to detect the discharge-side temperature of the compressor 1, and the second temperature detection unit 7 is configured to detect the temperature of refrigerant having been discharged from the compressor 1 and having passed through the accumulator 5 to perform heat exchange in the heat exchanger 9a.

Next, the structure of the accumulator 5 of the first embodiment will be described.

Figure 2:
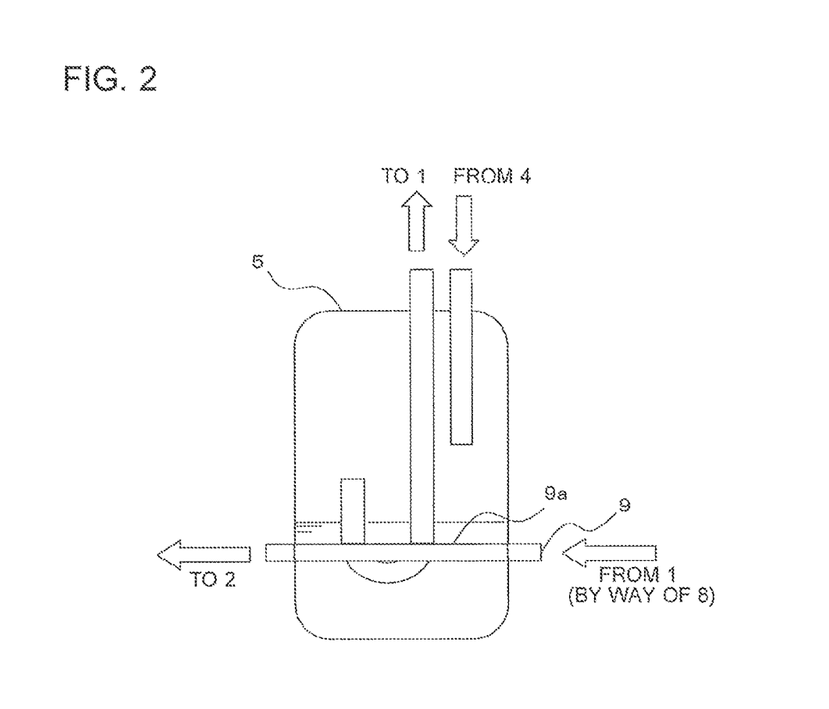
FIG. 2 is a cross-sectional view of the inside of an accumulator of the first embodiment.

FIG. 2 is a cross-sectional view of the inside of the accumulator of the first embodiment.

Figure 3:
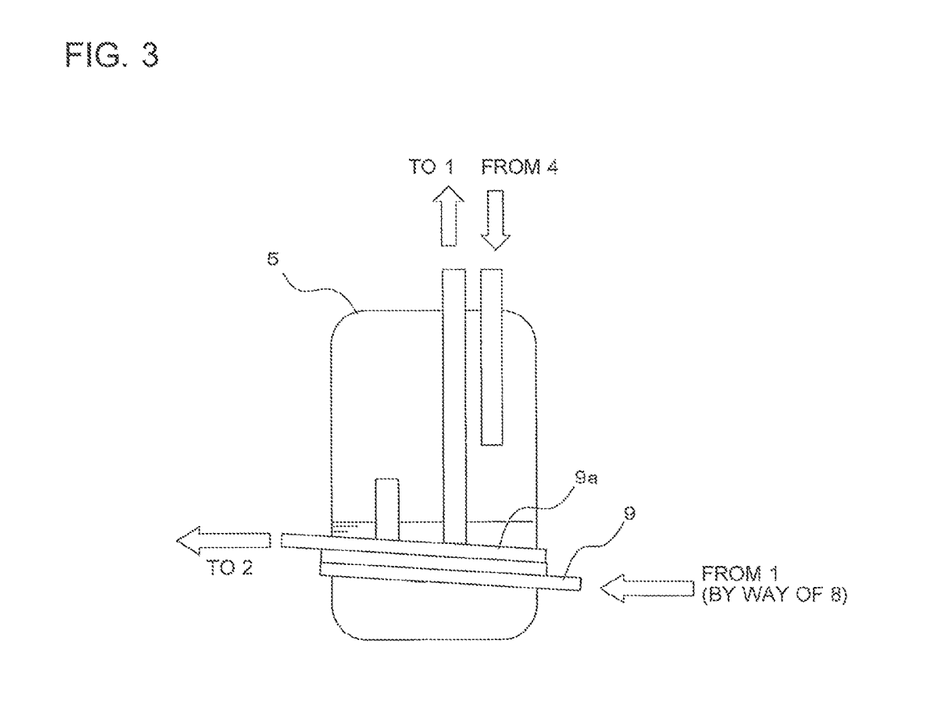
FIG. 3 is a cross-sectional view of another example of the inside of the accumulator of the first embodiment.

FIG. 3 is a cross-sectional view of another example of the inside of the accumulator of the first embodiment.

The structure is made, in which gaseous or two-phase refrigerant having flowed into the accumulator 5 from the evaporator 4 is separated in the accumulator 5, and only the gas component flows into a suction port of the compressor 1 through a U-shaped pipe. Moreover, the structure is further made, in which gas refrigerant having been discharged from the compressor 1 passes through the bypass 9, and then, indirectly contacts the liquid refrigerant of the accumulator 5 in the heat exchanger 9a to exchange heat with such liquid.

The heat exchanger 9a is provided at a position corresponding to equal to or higher than 5% and equal to or lower than 50% of the internal effective height of the accumulator 5 from a lower end thereof. As illustrated in FIG. 2, it can be configured so that the refrigerant pipes penetrate the accumulator 5 to heat liquid refrigerant by heat of gas refrigerant of the pipe. Alternatively, a pipe may be wrapped around a container wall of the accumulator 5 to heat liquid refrigerant through the container wall, as illustrated in FIG. 3. Note that the pipe may be wrapped from bottom to top, or may be wrapped from top to bottom.

Next, operation of the refrigeration cycle apparatus of the first embodiment will be described.

Figure 4:
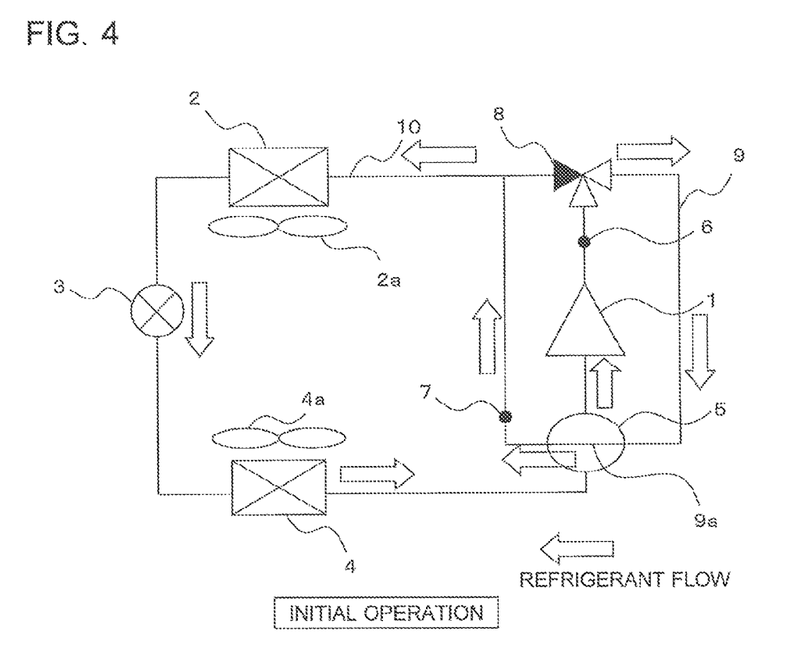
FIG. 4 is a diagram of a refrigerant flow in an initial state at the start of operation of the refrigeration cycle apparatus of the first embodiment.

FIG. 4 is a diagram of a refrigerant flow in an initial state at the start of operation of the refrigeration cycle apparatus of the first embodiment.

Figure 5:
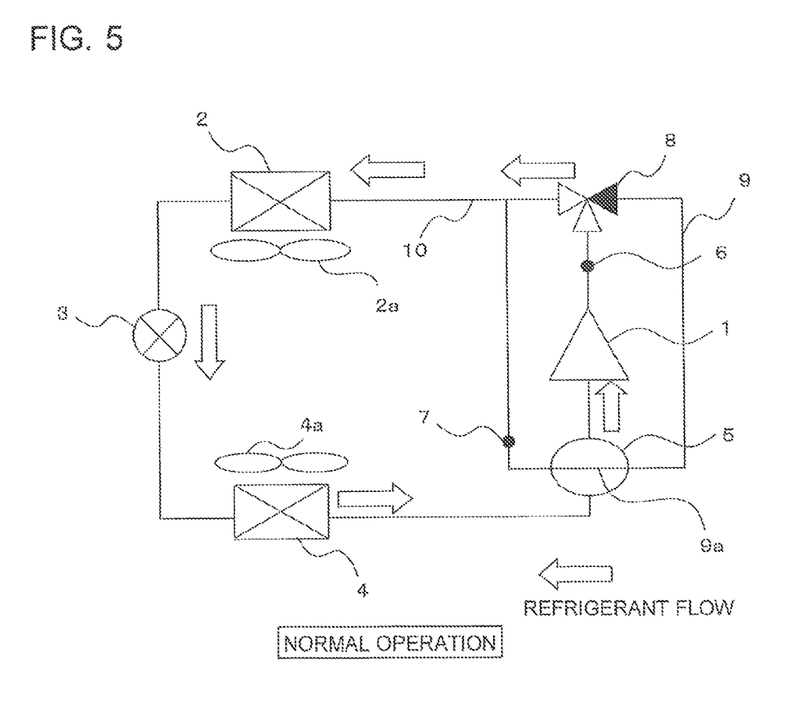
FIG. 5 is a diagram of a refrigerant flow in a normal operation of the refrigeration cycle apparatus of the first embodiment.

FIG. 5 is a diagram of a refrigerant flow in a normal operation of the refrigeration cycle apparatus of the first embodiment.

Figure 6:
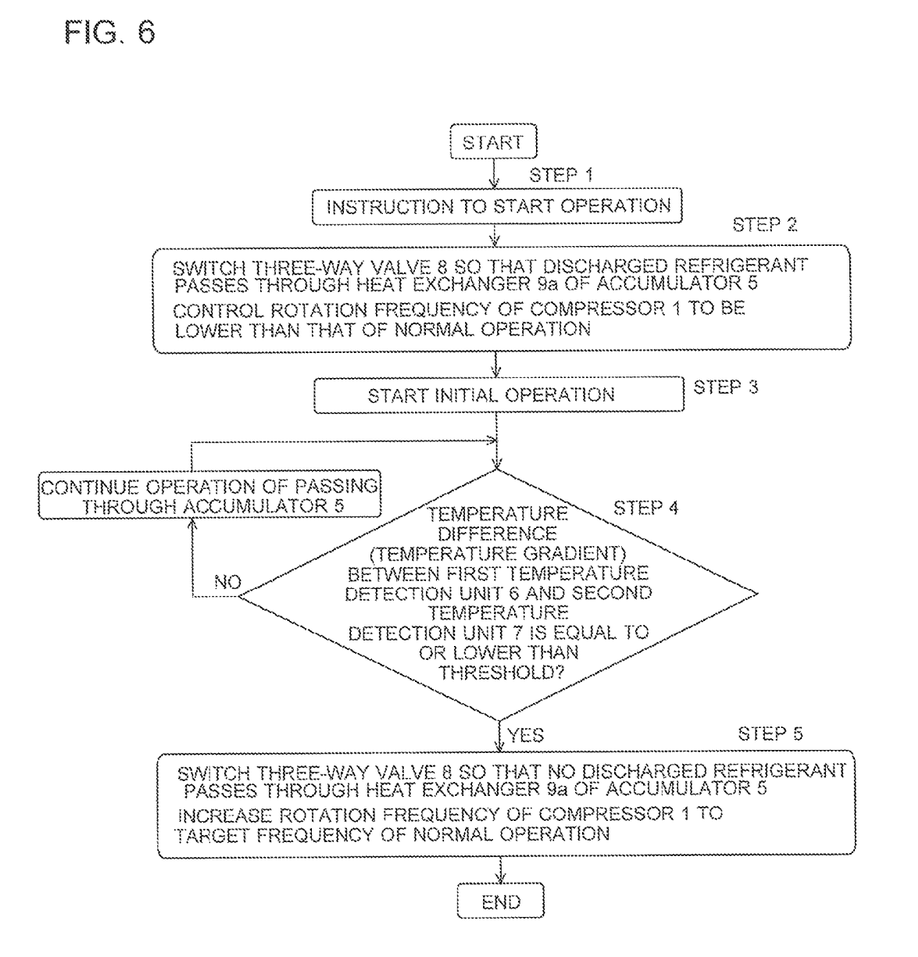
FIG. 6 is a control flowchart of the refrigeration cycle apparatus of the first embodiment.

FIG. 6 is a control flowchart of the refrigeration cycle apparatus of the first embodiment.

Figure 7:
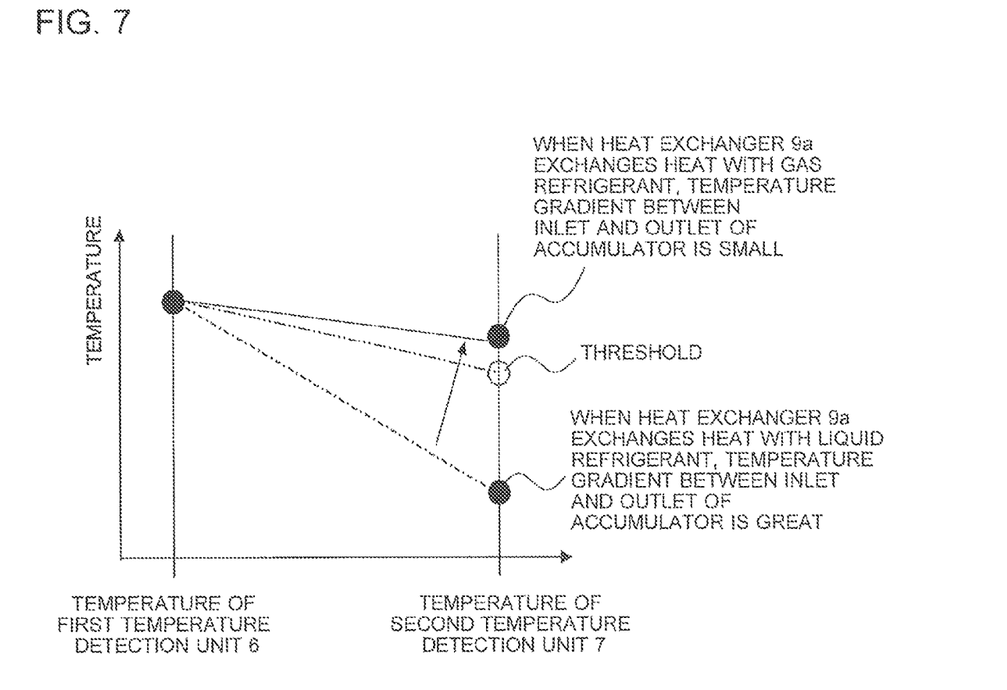
FIG. 7 is a graph of the temperature gradient of gas refrigerant before and after passing through the accumulator of the refrigeration cycle apparatus of the first embodiment.

FIG. 7 is a graph of the temperature gradient of gas refrigerant before and after passing through the accumulator of the refrigeration cycle apparatus of the first embodiment.

Figure 8:
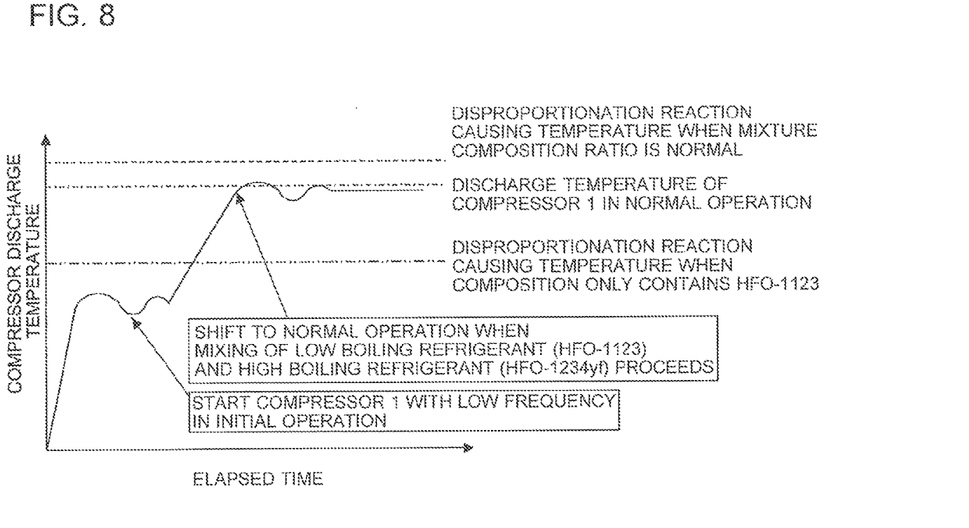
FIG. 8 is a graph of a change in the temperature of refrigerant discharged from a compressor in the initial state at the start of operation of the refrigeration cycle apparatus of the first embodiment.

FIG. 8 is a graph of a change in the temperature of refrigerant discharged from the compressor in the initial state at the start of operation of the refrigeration cycle apparatus of the first embodiment.

Figure 9:
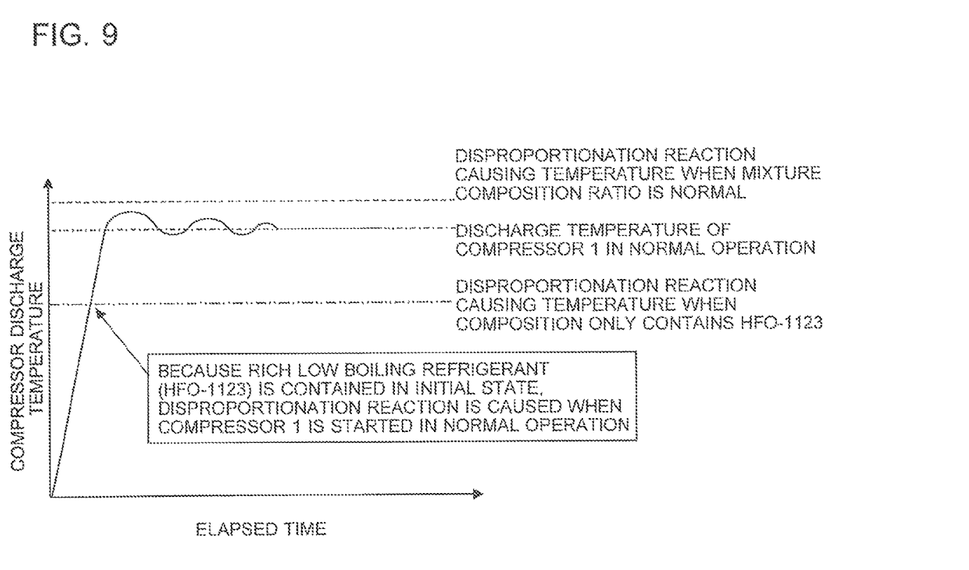
FIG. 9 is a graph of a change in the temperature of refrigerant discharged from a compressor in a normal operation of a typical refrigeration cycle apparatus.

FIG. 9 is a graph of a change in the temperature of refrigerant discharged from the compressor in a normal operation of a typical refrigeration cycle apparatus.

A working refrigerant of the refrigeration cycle apparatus of the first embodiment is a zeotropic refrigerant mixture, and is formed of a low boiling refrigerant (equivalent to the first refrigerant of the present invention) and a high boiling refrigerant (equivalent to the second refrigerant of the present invention). The low boiling refrigerant (the first refrigerant) has such characteristics that the refrigerant tends to cause a disproportionation reaction when receiving a certain level of energy under higher-temperature higher-pressure conditions. The high boiling refrigerant (the second refrigerant) has such characteristics that the refrigerant tends to more hardly cause a disproportionation reaction than the low boiling refrigerant (the first refrigerant) under the same conditions as those of the low boiling refrigerant (the first refrigerant) (or cause no disproportionation reaction under the same conditions as those of the low boiling refrigerant).

That is, the low boiling refrigerant (the first refrigerant) has such characteristics that there is a higher probability of causing the disproportionation reaction under the particular conditions (the high-temperature high-pressure conditions) identical to the pressure and temperature at which the high boiling refrigerant (the second refrigerant) causes no disproportionation reaction at all. Moreover, the high boiling refrigerant (the second refrigerant) has such characteristics that the refrigerant has a higher boiling point (tends to be less evaporated) than that of the low boiling refrigerant (the first refrigerant) under the same pressure.

For example, HFO-1123 can be employed as the low boiling refrigerant (the first refrigerant), and the disproportionation reaction needs to be taken into consideration. For example, R32, HFO-1234yf, or HFO-1234ze may be employed as the high boiling refrigerant (the second refrigerant). Although an additive is typically contained in refrigerating machine oil of refrigerant, monocyclic monoterpenoid is contained as a reaction inhibitor for the low boiling refrigerant (the first refrigerant). Moreover, the monocyclic monoterpenoid contains limonene, for example.

Note that it has been known that reaction tends to be suppressed when the low boiling refrigerant (the first refrigerant) is contained in a molar ratio of equal to or lower than 70%. Moreover, the high boiling refrigerant (the second refrigerant) is not limited to a single type, and may be two or more types.

In the case of using the zeotropic refrigerant mixture (e.g., a refrigerant mixture of HFO-1123 and HFO-1234yf), rich HFO-1234yf as the high boiling refrigerant is present in liquid refrigerant of a refrigerant circuit when the refrigeration cycle apparatus is stopped. Such liquid refrigerant is accumulated in the low-pressure side heat exchanger, the compressor 1, or the accumulator 5 in the refrigerant circuit. Moreover, rich HFO-1123 as the low boiling refrigerant is present in gas refrigerant.

From such a state, when the compressor 1 is started to start operation of the refrigeration cycle apparatus, HFO-1123 whose composition ratio is high in the gas refrigerant is mainly discharged from the compressor 1.

When energy is locally applied to the refrigerant with the refrigerant mixture containing rich HFO-1123, there is a probability of inducing the disproportionation reaction as described above. The inside of the compressor 1 is particularly under high temperature and high pressure, and therefore, there is a high probability of causing the reaction.

For these reasons, in the refrigeration cycle apparatus of the present embodiment, the following initial operation is, as in the control flow shown in FIG. 6, performed in the initial state at the start of operation.

First, when the instruction of starting operation of the refrigeration cycle apparatus is provided at step 1, the three-way valve 8 is, at step 2, switched as illustrated in FIG. 4 to control high-temperature high-pressure gas refrigerant having flowed out from the compressor 1 to pass through the heat exchanger 9a of the accumulator 5 in the bypass 9. Meanwhile, at step 2, the rotation frequency of the compressor 1 is controlled to a lower frequency than that in the normal operation. Note that the normal operation is the operation of controlling not only the rotation speed of the compressor 1 but also the rotation speed of a condenser fan 2a of the condenser 2, the opening degree of the expansion valve 3, or the rotation speed of an evaporator fan 4a of the evaporator 4 so that discharged refrigerant temperature and pressure reach target temperature and pressure corresponding to the target capacity (e.g., an air-cooling or air-heating rated operation) of the refrigeration cycle apparatus.

In such a state, the process proceeds to step 3 to start the initial operation of the refrigeration cycle apparatus. Then, the high-temperature high-pressure gas refrigerant is supplied to the heat exchanger 9a of the accumulator 5 through the three-way valve 8, and exchanges heat with liquid refrigerant accumulated in the accumulator 5 to heat and evaporate the liquid refrigerant containing rich high boiling refrigerant. Moreover since the rotation frequency of the compressor 1 is decreased to the lower frequency (e.g., equal to or lower than ⅔ of a rotation frequency in a normal rated operation), the refrigerant discharged from the compressor 1 is, as shown in FIG. 8, suppressed at low temperature and pressure in the initial state at the start of operation.

Since a higher composition ratio of HFO-1123 as the low boiling refrigerant in the zeotropic refrigerant mixture results in a higher probability of causing the disproportionation reaction, the temperature of refrigerant discharged from the compressor 1 can be suppressed at low temperature and pressure to prevent the disproportionation reaction of HFO-1123 as the low boiling refrigerant while a large amount of HFO-1234yf as the high boiling refrigerant is, as liquid refrigerant, present in the accumulator 5 in the initial state at the start of operation (i.e., during the initial state at the start of operation, during which the composition ratio of HFO-1123 as the low boiling refrigerant is high in the refrigerant circuit).

In the refrigeration cycle apparatus in the initial state at the start of operation as illustrated in FIG. 4, the refrigerant discharged from the compressor 1 in a low-temperature low-pressure state flows into the condenser 2 from the three-way valve 8 by way of the accumulator 5, and then, is condensed by heat exchange. After condensation, the pressure of the refrigerant is reduced by the expansion valve 3. Such refrigerant flows into the evaporator 4 in a liquid or two-phase state, and then, is evaporated by heat exchange. After evaporation, the gas refrigerant returns to the compressor 1 through the accumulator 5. In this manner, a cycle is formed.

Note that since operation is performed with a small refrigerant discharge amount, i.e., the rotation frequency of the compressor 1 equal to or lower than ⅔ of the rotation frequency in the normal rated operation, a flow velocity is lower in the bypass 9 when the discharged refrigerant is branched into the main passage 10 and the bypass 9, and therefore, refrigerating machine oil is accumulated. For this reason, the whole amount of discharged refrigerant preferably flows, using the three-way valve, toward the bypass 9 in the initial state at the start of operation.

Next, the process proceeds to step 4, and it is determined whether or not liquid refrigerant is present in the accumulator 5.

That is, the temperature of gas refrigerant discharged from the compressor 1 and supplied to the accumulator 5 is detected by the first temperature detection unit 6, and the temperature of discharged gas refrigerant after heat exchange in the accumulator 5 is detected by the second temperature detection unit 7. Then, the temperature difference (the temperature gradient as shown in FIG. 7) between these refrigerants is calculated as shown in FIG. 7.

When the discharged gas refrigerant temperature difference between an inlet and an outlet of the accumulator 5 is great, the liquid refrigerant (having a great heat capacity) containing rich high-boiling-point component is accumulated in the accumulator 5, and the temperature of discharged gas refrigerant after heat exchange tends to significantly decrease. On the other hand, when the discharged gas refrigerant temperature difference between the inlet and the outlet of the accumulator 5 is small, evaporation of the liquid refrigerant containing rich high-boiling-point component is completed in the accumulator 5 (i.e., a heat capacity is low), and a heat exchange efficiency is lowered. Thus, the temperature of gas refrigerant after heat exchange does not tend to decrease.

For this reason, it is, at step 4, determined whether the gradient of such a temperature decrease is greater or smaller than a threshold of a particular gradient as shown in FIG. 7. When the gradient of the temperature decrease is greater than the gradient as the threshold, liquid refrigerant is present in the accumulator 5, and therefore, the accumulator 5 is continuously heated. Conversely, when the gradient of the temperature decrease is smaller than the gradient as the threshold, it is determined that liquid refrigerant is evaporated in the accumulator 5, and the process proceeds to step 5.

At step 5, the three-way valve 8 is switched as illustrated in FIG. 5, and the gas refrigerant discharged from the compressor 1 does not supplied to the accumulator 5, but is directly supplied to the condenser 2.

In the refrigeration cycle apparatus in the normal operation state illustrated in FIG. 5, the rotation frequency of the compressor 1 is increased to a value corresponding to the target capacity of the refrigeration cycle apparatus, and the state of the discharged refrigerant is controlled to the target temperature or pressure. Such discharged refrigerant flows into the condenser 2 through the three-way valve 8, and then, is condensed by heat exchange. After condensation, the pressure of such refrigerant is reduced by the expansion valve 3. The refrigerant in a liquid or two-phase state flows into the evaporator 4, and then, is evaporated by heat exchange. After evaporation, the gas refrigerant returns to the compressor 1 through the accumulator 5. In this manner, a cycle is formed.

Note that there may be plural thresholds of the gradient, and the compressor frequency may be increased for each threshold.

Next, a change in the temperature of refrigerant discharged from the compressor in association with an elapsed operation time will be described with reference to FIGS. 8 and 9.

A chain double-dashed line in each figure indicates a disproportionation reaction generation temperature in the case of a working refrigerant composition containing only HFO-1123. A dashed line indicates a disproportionation reaction generation temperature in the case of the composition ratio of the zeotropic refrigerant mixture (HFO-1123 and HFO-1234yf) in the normal operation. A dashed-dotted line indicates the temperature of refrigerant discharged from the compressor 1 in the normal operation. In control of the normal operation as shown in FIG. 9, control is made so that the refrigerant discharged from the compressor 1 reaches the target temperature and pressure immediately after the start of operation. However, since the initial state at the start of operation is the state in which rich HFO-1123 is contained in the refrigerant circuit, the disproportionation reaction might be caused before the discharge temperature and pressure of the compressor 1 reach the target values.

On the other hand, in the initial state at the start of operation, the refrigeration cycle apparatus of the present embodiment operates, considering safety, at the compressor discharged refrigerant temperature equal to or lower than the chain double-dashed line indicating the disproportionation reaction generation temperature so that no disproportionation reaction is caused even in the case of the composition ratio of HFO-1123 alone, as shown in FIG. 8.

When the discharged gas refrigerant temperature difference between the inlet and the outlet of the accumulator 5 is smaller than the temperature gradient as the threshold, the high boiling refrigerant (HFO-1234yf) in the accumulator 5 is evaporated, and it is determined that the composition ratio of the low boiling refrigerant (HFO-1123) decreases in the refrigerant circuit. Then, the three-way valve 8 is switched as illustrated in FIG. 5, and the rotation frequency of the compressor 1 is increased so that the discharge temperature and pressure increase. Thus, the initial state shifts to the normal operation state.

Note that the temperature of the first temperature detection unit 6 is under the highest temperature and pressure in the refrigeration cycle apparatus, and therefore, the refrigeration cycle apparatus is controlled upon startup of the compressor 1 so that the detection temperature of the first temperature detection unit 6 is suppressed to equal to or lower than the temperature causing no disproportionation reaction even in the case of containing only the refrigerant (e.g., HFO-1123) causing the disproportionation reaction. In such a state, not only the rotation frequency of the compressor 1 is reduced, but also any or a combination of the controls of increasing the rotation speed of the condenser fan 2a of the condenser 2, increasing the opening degree of the expansion valve 3, and decreasing the rotation speed of the evaporator fan 4a of the evaporator 4 can be performed as the initial operation.

Next, the advantageous effects of the refrigeration cycle apparatus of the first embodiment will be described. In the case of the zeotropic refrigerant mixture of HFO-1123 as the low boiling refrigerant and HFO-1234yf as the high boiling refrigerant, rich HFO-1123 is, at the start of operation, contained in the refrigerant circuit due to the boiling point difference, and therefore, the disproportionation reaction tends to be caused even under lower temperature and pressure than those in the normal operation. For this reason, operation is performed with a low rotation frequency of the compressor 1 in the initial state at the start of operation so that the discharged refrigerant temperature and pressure are reduced. Consequently, the disproportionation reaction can be prevented.

Heat of the gas refrigerant discharged from the compressor 1 in the initial state at the start of operation enhances evaporation of the high boiling refrigerant (HFO-1234yf) as liquid refrigerant accumulated in the accumulator 5, and therefore, the composition ratio of the zeotropic refrigerant mixture can change to that in the normal operation state within a short period of time.

Further, after the composition of the zeotropic refrigerant mixture has changed to that in the normal operation state, the three-way valve 8 is switched so that the discharged refrigerant flows into the condenser 2 without passing through the accumulator 5, and therefore, excessive heating of the inside of the accumulator 5 can be prevented.

Since the heat exchanger 9a through which gas refrigerant passes is provided at the position corresponding to equal to or higher than 5% and equal to or lower than 50% of the internal effective height of the accumulator 5 from the lower end thereof, it can be ensured that the liquid refrigerant containing rich high boiling refrigerant (HFO-1234yf) is heated and evaporated, and heating more than necessary can be prevented. Further, liquid refrigerant in the accumulator 5 can be efficiently evaporated, and therefore, the initial state can shift to the normal operation such as the air-cooling or air-heating operation within a short period of time.

The change in the temperature gradient due to the temperature difference between the first temperature detection unit 6 and the second temperature detection unit 7 is detected to determine the level of liquid refrigerant accumulated in the accumulator 5, and therefore, the initial state can shift to the normal operation by a simple configuration including no level sensor.

Second Embodiment

Next, the configuration of a refrigeration cycle apparatus of a second embodiment will be described.

Figure 10:
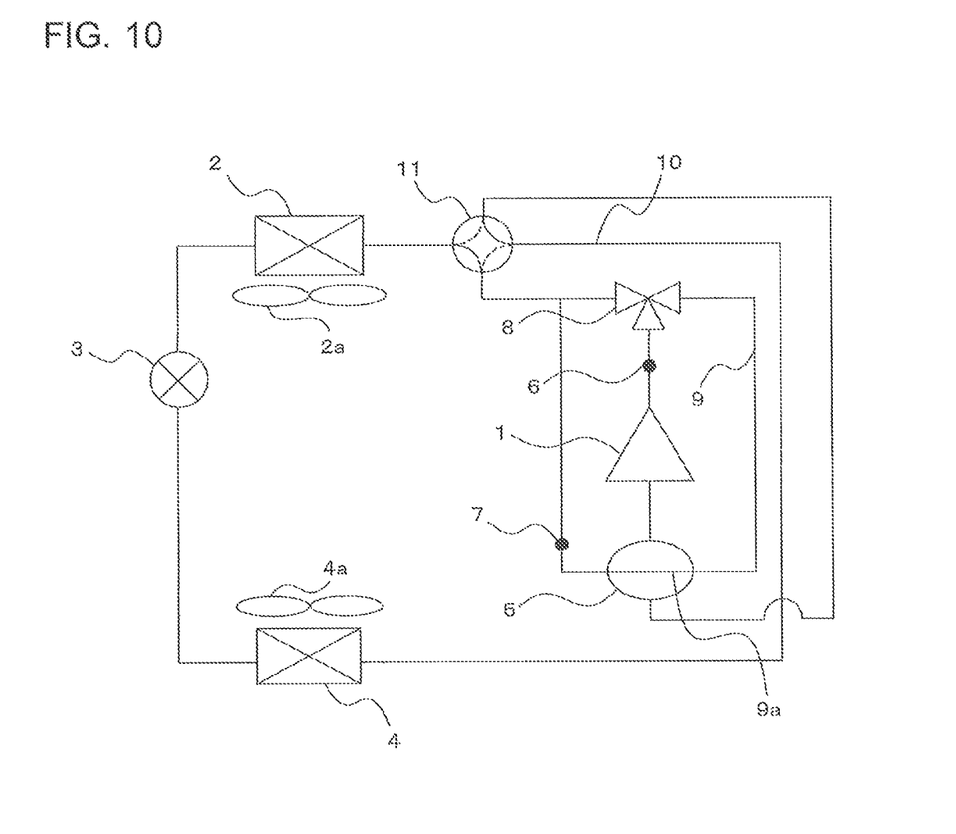
FIG. 10 is a schematic configuration diagram of a refrigeration cycle apparatus of a second embodiment.

FIG. 10 is a schematic configuration diagram of the refrigeration cycle apparatus of the second embodiment.

A basic configuration of the refrigeration cycle apparatus of the second embodiment is similar to that of the first embodiment, but the refrigeration cycle apparatus of the second embodiment is different from that of the first embodiment in that a four-way valve 11 is provided downstream of a three-way valve 8 to switch a refrigerant flow direction. Thus, only such a point will be described. Note that the same reference numerals as those of the first embodiment are used to represent equivalent elements (the condenser 2 and the evaporator 4 act as a heat exchanger in the first embodiment, but the four-way valve 11 may be switched to cause a condenser 2 to act as an evaporator and to cause an evaporator 4 to act as a condenser in the second embodiment).

Next, operation of the refrigeration cycle apparatus of the second embodiment will be described.

The refrigeration cycle apparatus of the second embodiment employs, as a working refrigerant, a zeotropic refrigerant mixture similar to that of the first embodiment.

The four-way valve 11 switches the refrigerant circulation direction so that an air-cooling or air-heating operation can be performed for an air-conditioned space.

Figure 11:
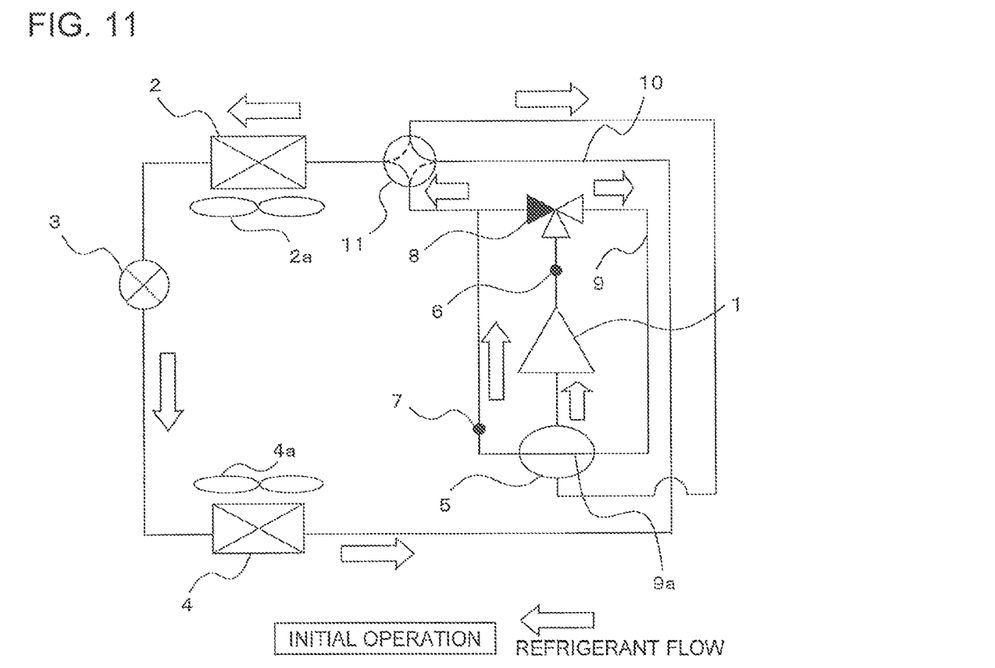
FIG. 11 is a diagram of a refrigerant flow in an initial state at the start of operation of the refrigeration cycle apparatus of the second embodiment.

FIG. 11 is a diagram of a refrigerant flow in an initial state at the start of operation of the refrigeration cycle apparatus of the second embodiment.

Figure 12:
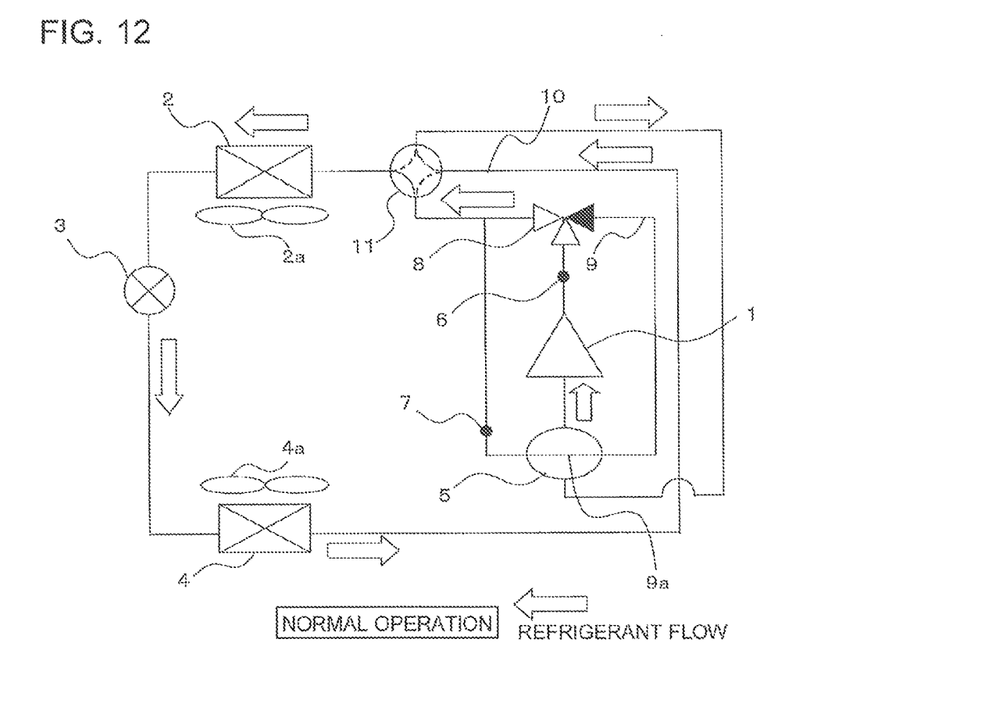
FIG. 12 is a diagram of a refrigerant flow in a normal operation of the refrigeration cycle apparatus of the second embodiment.

FIG. 12 is a diagram of a refrigerant flow in a normal operation of the refrigeration cycle apparatus of the second embodiment.

In the initial state at the start of operation, evaporation of high boiling refrigerant (HFO-1234yf) as liquid refrigerant accumulated in an accumulator 5 is, as in the first embodiment, enhanced by heat of gas refrigerant discharged from a compressor 1 as illustrated in FIG. 11, and therefore, the composition ratio of the zeotropic refrigerant mixture can change into that in the normal operation state within a short period of time. Subsequently, the three-way valve 8 is switched as illustrated in FIG. 12, and the initial state shifts to the normal operation.

As in the first embodiment, a control flow in such shift control is as shown in FIG. 6.

Advantageous effects of the refrigeration cycle apparatus of the second embodiment will be described.

The refrigeration cycle apparatus of the second embodiment has the path for heating the inside of the accumulator 5 as in the refrigeration cycle apparatus of the first embodiment. Particularly in the initial state at the start of operation of the compressor 1, the liquid refrigerant containing rich high boiling refrigerant (HFO-1234yf) accumulated in the accumulator 5 is evaporated by heating so that the composition ratio of the zeotropic refrigerant mixture can change into that in the normal operation state within a short period of time. Discharged refrigerant temperature and pressure are suppressed in such a manner that the rotation speed of the compressor 1 is lowered during heating of the accumulator 5, and therefore, a disproportionation reaction of low boiling refrigerant (HFO-1123) can be reduced. Moreover, the four-way valve 11 provided as illustrated in FIG. 10 allows the air-cooling or air-heating operation for the air-conditioned space.

Third Embodiment

Next, the configuration of a refrigeration cycle apparatus of a third embodiment will be described.

Figure 13:
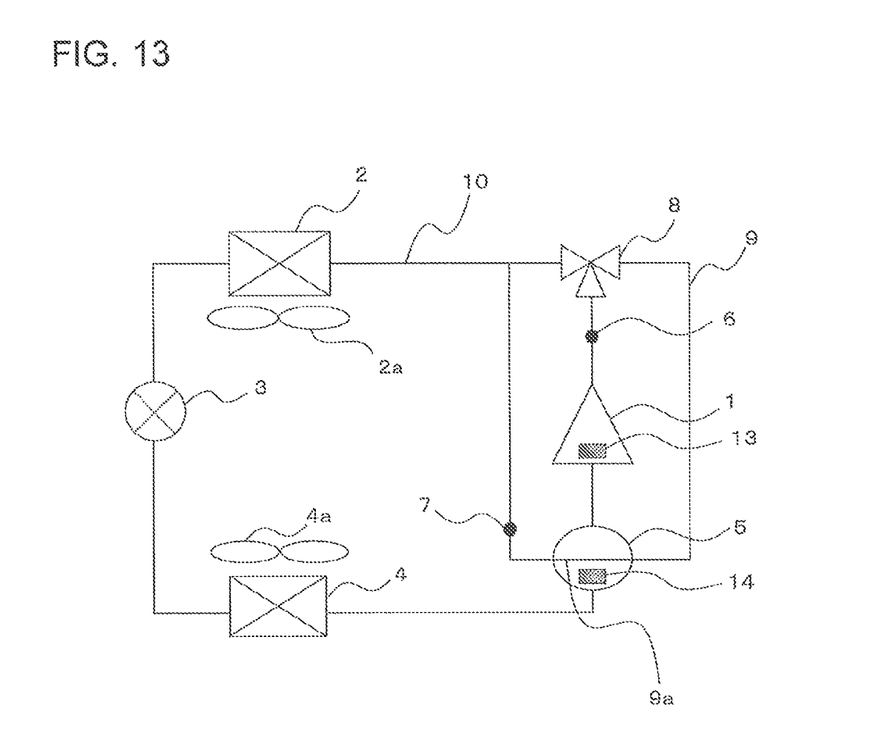
FIG. 13 is a schematic configuration diagram of a refrigeration cycle apparatus of a third embodiment.

FIG. 13 is a schematic configuration diagram of the refrigeration cycle apparatus of the third embodiment.

A basic configuration of the refrigeration cycle apparatus of the third embodiment is similar to that of the first embodiment, but the refrigeration cycle apparatus of the third embodiment is different from that of the first embodiment in the following point: in addition to the configuration in which refrigerant discharged from a compressor 1 is supplied to an accumulator 5 in an initial state at the start of operation, a compressor heating unit 13 and an accumulator heating unit 14 are provided for heating at the points where refrigerant tends to accumulate when the compressor 1, the accumulator 5, etc. are stopped.

For example, a heating unit configured to apply power (i.e., perform constraint energization), without driving a motor in the compressor 1, to a motor winding to generate heat for heating the compressor 1 can be used as the compressor heating unit 13.

Alternatively, the configuration may be employed, in which, e.g., an electric heater is attached to an outer surface of the compressor 1. The electric heater may employ various heating methods such as resistance heating and induction heating.

As in the compressor heating unit 13, a heating unit configured so that, e.g., an electric heater is attached to an outer surface of the accumulator 5 may be used as the accumulator heating unit 14.

Next, operation of the refrigeration cycle apparatus of the third embodiment will be described.

The refrigeration cycle apparatus of the third embodiment employs, as a working refrigerant, a zeotropic refrigerant mixture similar to that of the first embodiment.

In the initial state at the start of operation, the gas refrigerant discharged from the compressor 1 is, as in the first embodiment, supplied to the accumulator 5 to heat the accumulator 5, and evaporation of high boiling refrigerant (HFO-1234yf) as liquid refrigerant accumulated in the compressor 1 and the accumulator 5 is enhanced by heating using each heating unit. As a result, the composition ratio of the zeotropic refrigerant mixture can change into that in a normal operation state within a short period of time. At this point, the third embodiment is similar to the first embodiment in that the rotation frequency of the compressor 1 is suppressed low. Subsequently, a three-way valve 8 is switched, and the initial state shifts to the normal operation. Note that the accumulator heating unit 14 is provided at a position corresponding to equal to or higher than 5% and equal to or lower than 50% of the internal effective height of the accumulator 5 from a lower end thereof. Thus, it can be ensured that the liquid refrigerant containing rich high boiling refrigerant (HFO-1234yf) is heated and evaporated, and heating more than necessary can be prevented. Moreover, liquid refrigerant in the accumulator 5 can be efficiently evaporated, and therefore, the initial state can shift to the normal operation such as an air-cooling or air-heating operation within a short period of time.

In control of driving of the compressor heating unit 13 and the accumulator heating unit 14, heating can be terminated at the step (step 5) of evaporating liquid refrigerant in the accumulator 5 according to the control flow of FIG. 6 as in the first embodiment. The control of detecting the temperature of bottom outer surfaces of the compressor 1 and the accumulator 5 and the temperature of refrigerant discharged from the compressor 1 and the accumulator 5 to perform heating driving until these temperatures increase to predetermined temperatures may be applied. Alternatively, a timing unit such as a timer configured to measure time from startup of the compressor 1 may be provided, and the control of performing heating driving of the heating unit for a predetermined time from startup of the compressor 1 may be applied. In such control, an external temperature may be detected. In addition, when the external temperature is low, it may be determined that the amount of accumulated liquid refrigerant is large, and the time for driving the heating unit may be corrected to a greater time.

Advantageous effects of the refrigeration cycle apparatus of the third embodiment will be described.

In the initial state at the start of operation, the refrigeration cycle apparatus of the third embodiment evaporates, by the gas refrigerant discharged from the compressor 1 and each heating unit, the liquid refrigerant containing rich high boiling refrigerant (HFO-1234yf) accumulated in the compressor 1 and the accumulator 5 so that the composition ratio of the zeotropic refrigerant mixture can change into that in the normal operation state within a short period of time. Discharged refrigerant temperature and pressure are suppressed in such a manner that the rotation speed of the compressor 1 is lowered during driving of the heating units, and therefore, a disproportionation reaction of low boiling refrigerant (HFO-1123) can be reduced.

Fourth Embodiment

Next, the configuration of a refrigeration cycle apparatus of a fourth embodiment will be described.

Figure 14:
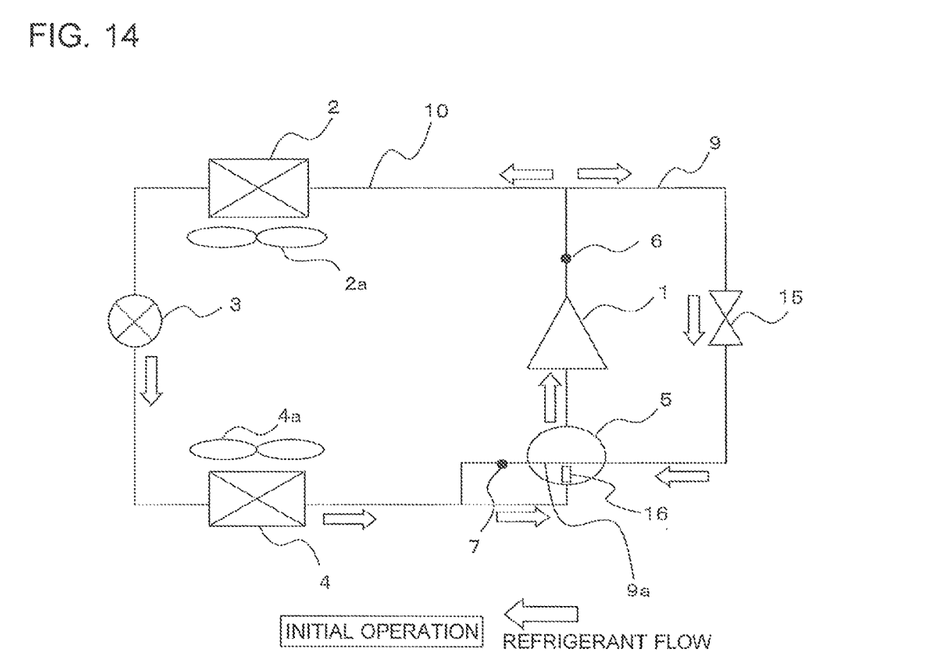
FIG. 14 is a schematic configuration diagram when a hot gas bypass valve of a refrigeration cycle apparatus of a fourth embodiment opens.
Figure 15:
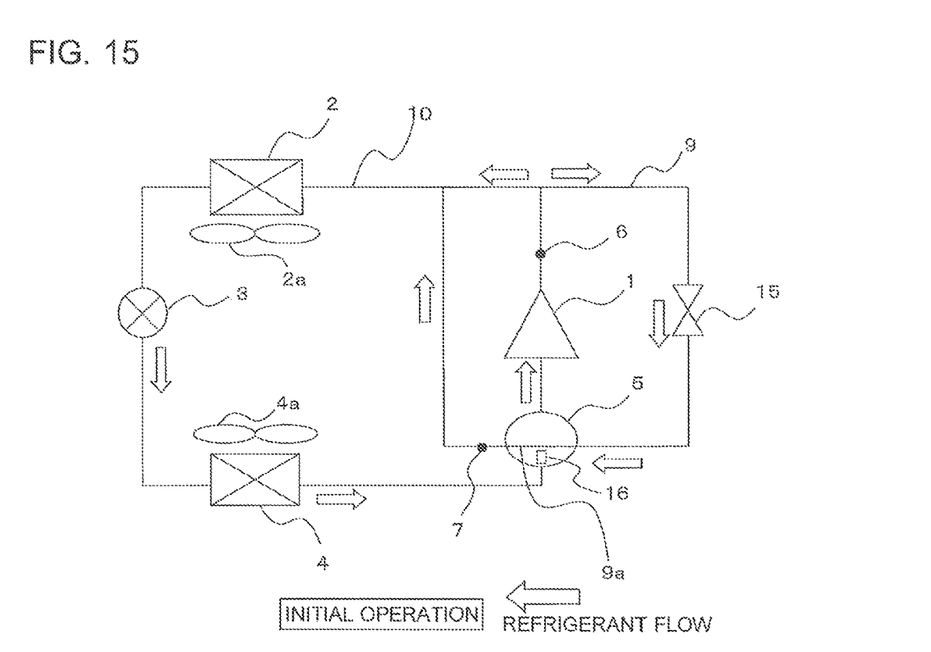
FIG. 15 is a schematic configuration diagram of another example when the hot gas bypass valve of the refrigeration cycle apparatus of the fourth embodiment opens.

A basic configuration of the refrigeration cycle apparatus of the fourth embodiment is similar to that of the first embodiment, but the refrigeration cycle apparatus of the fourth embodiment is different from that of the first embodiment in the following points: a hot gas bypass valve 15 (equivalent to a two-way valve of the present invention) configured to control refrigerant circulation is, instead of the three-way valve, provided to supply gas refrigerant discharged from a compressor 1 to an accumulator 5; and a liquid surface detection unit 16 configured to measure the level of liquid refrigerant in the accumulator 5 is provided. The discharged refrigerant having heated the accumulator 5 joins an outlet side of an evaporator 4 as illustrated in FIG. 14 or an inlet side of a condenser 2 as illustrated in FIG. 15.

The liquid surface detection unit 16 provided at the accumulator 5 is provided instead of the liquid refrigerant level detection unit using the temperature gradient of the discharged gas refrigerant as illustrated in FIG. 7 and as described in the first embodiment.

For example, the following methods may be employed for the liquid surface detection unit 16: a thermistor method for measuring a liquid surface from the temperature difference between a liquid portion and a gas portion; an optical method using alight emitter and a light receiver to measure a liquid surface from a light transmission state; an electrostatic capacity probe method for detecting the electrostatic capacity of liquid refrigerant or refrigerating machine oil to measure a liquid surface; and an ultrasonic method for measuring a liquid surface from time measured until ultrasonic waves are reflected and return.

Next, operation of the refrigeration cycle apparatus of the fourth embodiment will be described.

The refrigeration cycle apparatus of the fourth embodiment employs, as a working refrigerant, a zeotropic refrigerant mixture similar to that of the first embodiment.

In an initial state at the start of operation, the gas refrigerant discharged from the compressor 1 is, as in the first embodiment, supplied to the accumulator 5 through the hot gas bypass valve 15 of a bypass 9, and evaporation of high boiling refrigerant (HFO-1234yf) as liquid refrigerant accumulated in the accumulator 5 is enhanced by heating. As a result, the composition ratio of the zeotropic refrigerant mixture can change into that in a normal operation state within a short period of time. At this point, the fourth embodiment is similar to the first embodiment in that the rotation frequency of the compressor 1 is suppressed low.

Moreover, in the initial state at the start of operation, the rotation speed of a condenser fan 2a of the condenser 2 may be increased to be higher than that in the normal operation (an air-cooling or air-heating rated operation), or the rotation speed of an evaporator fan 4a of the evaporator 4 may be decreased to be lower than that in the normal operation (the air-cooling or air-heating rated operation).

High-speed operation is performed so that the rotation speed of the condenser fan 2a of the condenser 2 is equal to or higher than 4/3 of the rotation speed in the normal operation (the air-cooling or air-heating rated operation), or low-speed operation is performed so that the rotation speed of the evaporator fan 4a of the evaporator 4 is equal to or lower than 2/3 of the rotation speed in the normal operation (the air-cooling or air-heating rated operation).

In the first embodiment, the three-way valve 8 is, as shown in FIG. 6, switched in association with a change in the temperature gradient of discharged gas refrigerant subjected to heat exchange in the accumulator 5, and therefore, the initial state shifts to the normal operation. However, in the fourth embodiment, the level of liquid refrigerant in the accumulator 5 is measured by the liquid surface detection unit 16, and then, when the liquid surface level decreases to equal to or lower than a threshold, the hot gas bypass valve 15 is closed so that the initial state shifts to the normal operation. In such shift, the initial state can shift to the normal operation by the control of increasing the rotation frequency of the compressor 1 based on a decrease in the amount of liquid refrigerant in the accumulator 5, the control of decreasing the rotation speed of the condenser fan 2a based on a decrease in the amount of liquid refrigerant in the accumulator 5, or the control of increasing the rotation speed of the evaporator fan 4a based on a decrease in the amount of liquid refrigerant in the accumulator 5, for example.

FIG. 14 is a schematic configuration diagram when the hot gas bypass valve of the refrigeration cycle apparatus of the fourth embodiment opens.

In the initial state at the start of operation, the gas refrigerant having been discharged from the compressor 1 flows to branch into the condenser 2 and the hot gas bypass valve 15. The refrigerant having flowed into the condenser 2 flows through the expansion valve 3 and the evaporator 4 in this order. The refrigerant having flowed into the hot gas bypass valve 15 heats and evaporates liquid refrigerant in the accumulator 5. The refrigerant having flowed out from the accumulator 5 joins other refrigerant on the outlet side of the evaporator 4, and then, is sucked into the compressor 1 through the accumulator 5.

Subsequently, when the level, detected by the liquid surface detection unit 16, of liquid refrigerant in the accumulator 5 falls below the threshold, the hot gas bypass valve 15 is closed to increase the rotation frequency of the compressor 1 so that the initial state shifts to the normal operation.

FIG. 15 is a schematic configuration diagram of another example when the hot gas bypass valve of the refrigeration cycle apparatus of the fourth embodiment opens.

In the initial state at the start of operation, the gas refrigerant having been discharged from the compressor 1 flows, as in FIG. 14, to branch into the condenser 2 and the hot gas bypass valve 15, but the refrigerant having flowed out from the accumulator 5 joins other refrigerant on the inlet side of the condenser 2. Shift to the normal operation based on the detection result of the liquid surface detection unit 16 is similar to that of the example of FIG. 14.

Note that the amount of heating of the accumulator 5 may be adjusted in such a manner that the opening degree of the hot gas bypass valve 15 is high at the initial stage of startup of the compressor 1 and is, based on plural thresholds, decreased with a decrease in the liquid surface level in the accumulator 5.

Advantageous effects of the refrigeration cycle apparatus of the fourth embodiment will be described.

In the initial state at the start of operation, the refrigeration cycle apparatus of the fourth embodiment evaporates, by the gas refrigerant discharged from the compressor 1, the liquid refrigerant containing rich high boiling refrigerant (HFO-1234yf) accumulated in the compressor 1 and the accumulator 5 so that the composition ratio of the zeotropic refrigerant mixture can change into that in the normal operation state within a short period of time. Moreover, part of the discharged refrigerant flows through the hot gas bypass valve 15, and the remaining part of the discharged refrigerant flows toward the condenser 2. Thus, e.g., the air-cooling/heating operation can continue in parallel to heating of the accumulator 5.

Further, in the initial state at the start of operation, while the hot gas bypass valve 15 opens, the rotation speed of the compressor 1 is suppressed low so that a discharged refrigerant temperature is suppressed. Thus, a disproportionation reaction of low boiling refrigerant (HFO-1123) can be reduced.

Alternatively, pressures on high and low pressure sides in a refrigeration cycle are lowered in such a manner that the rotation speed of the condenser fan 2a is increased to be higher than that in the normal operation (the air-cooling or air-heating rated operation) or that the rotation speed of the evaporator fan 4a is decreased to be lower than that in the normal operation (the air-cooling or air-heating rated operation). This decreases the discharge pressure and temperature of the compressor 1. As a result, the disproportionation reaction of the zeotropic refrigerant mixture can be prevented.

Moreover, the level of liquid refrigerant in the accumulator 5 is accurately detected by the liquid surface detection unit 16, and the initial state shifts to the normal operation after the composition ratio of the zeotropic refrigerant mixture has changed to that in the normal operation state. Thus, it can be ensured that the disproportionation reaction is prevented. The opening degree of the hot gas bypass valve 15 is adjusted to a lower degree based on a decrease in the level of liquid refrigerant in the accumulator 5, and therefore, excessive heating of the accumulator 5 can be prevented.

The first to fourth embodiments has been described above, but the present invention is not limited to these embodiments. All or part of the embodiments may be combined together.

REFERENCE SIGNS LIST 1 compressor 2 condenser 2a condenser fan 3 expansion valve 4 evaporator 4a evaporator fan 5 accumulator (equivalent to gas-liquid separator of the present invention) 6 first temperature detection unit 7 second temperature detection unit 8 three-way valve 9 bypass 9a heat exchanger 10 main passage 11 four-way valve 13 compressor heating unit 14 accumulator heating unit 15 hot gas bypass valve 16 liquid surface detection unit

The invention claimed is:

1. A refrigeration cycle apparatus using, as a working refrigerant, a zeotropic refrigerant mixture of a first refrigerant and a second refrigerant, which has a higher boiling point than that of the first refrigerant under a same pressure, the refrigeration cycle apparatus comprising at least a main passage sequentially connecting a compressor, a first heat exchanger, an expansion valve, a second heat exchanger, and a gas-liquid separator, wherein
   the first refrigerant is HFO-1123,
   the second refrigerant contains at least one or more of R32, HFO-1234yf, and HFO-1234ze,
   in an initial state after startup of the compressor, the refrigeration cycle apparatus is configured to perform an initial operation decreasing a temperature or a pressure of refrigerant discharged from the compressor so that disproportionation reaction of the first refrigerant does not occur based on an amount of liquid refrigerant in the gas-liquid separator.

2. The refrigeration cycle apparatus of claim 1, further configured to control any one or more of a rotation frequency of the compressor, the expansion valve, a fan corresponding to the first heat exchanger, and a fan corresponding to the second heat exchanger to adjust the temperature or the pressure of the refrigerant discharged from the compressor.

3. The refrigeration cycle apparatus of claim 1, wherein, during the initial operation, the refrigeration cycle apparatus is further configured to perform any one or more of
   a control of decreasing a rotation frequency of the compressor to be lower than that in a normal operation,
   a control of increasing a rotation speed of a fan corresponding to one of the first heat exchanger or the second heat exchanger acting as a condenser to be higher than that in the normal operation, a control of decreasing a rotation speed of a fan corresponding to one of the first heat exchanger or the second heat exchanger acting as an evaporator to be lower than that in the normal operation, and a control of increasing an opening degree of the expansion valve to be wider than that in the normal operation.

4. The refrigeration cycle apparatus of claim 3, wherein the normal operation is an operation of controlling the rotation frequency of the compressor and at least one of a rotation speed of the fan corresponding to one of the first heat exchanger or the second heat exchanger acting as a condenser, the opening degree of the expansion valve, or the rotation speed of the fan corresponding to one of the first heat exchanger or the second heat exchanger acting as an evaporator, so that discharged refrigerant temperature and pressure reach a target temperature and pressure corresponding to a target capacity of the refrigeration cycle apparatus.

5. The refrigeration cycle apparatus of claim 1, wherein, when the amount of the liquid refrigerant in the gas-liquid separator falls below a threshold, the refrigeration cycle apparatus is further configured to finish the initial operation and shift to a normal operation by increasing the temperature or the pressure of the refrigerant discharged from the compressor.

6. The refrigeration cycle apparatus of claim 5, wherein the normal operation is an operation of controlling a rotation frequency of the compressor and at least one of a rotation speed of a fan corresponding to one of the first heat exchanger or the second heat exchanger acting as a condenser, an opening degree of the expansion valve, or a rotation speed of a fan corresponding to one of the first heat exchanger or the second heat exchanger acting as an evaporator, so that discharged refrigerant temperature and pressure reach a target temperature and pressure corresponding to a target capacity of the refrigeration cycle apparatus.

7. The refrigeration cycle apparatus of claim 1, further comprising a heater configured to heat the gas-liquid separator, wherein the gas-liquid separator is heated by the heater during the initial operation.

8. The refrigeration cycle apparatus of claim 7, wherein the heater uses, as a heat source, the refrigerant discharged from the compressor.

9. The refrigeration cycle apparatus of claim 8, wherein the heater includes
a bypass branched from the main passage and configured to supply the refrigerant discharged from the compressor to a heat exchanger configured to exchange heat with the liquid refrigerant in the gas-liquid separator, and
an on-off valve provided at the bypass.

10. The refrigeration cycle apparatus of claim 9, wherein,
during the initial operation, the on-off valve opens to allow the discharged refrigerant to pass through the bypass, and,
when the initial operation is shifted to the normal operation, the on-off valve closes.

11. The refrigeration cycle apparatus of claim 9, wherein the on-off valve is a three-way valve provided at a branched portion between the main passage and the bypass.

12. The refrigeration cycle apparatus of claim 9, wherein the on-off valve is a two-way valve provided at the bypass.

13. The refrigeration cycle apparatus of claim 9, wherein the amount of the liquid refrigerant in the gas-liquid separator is detected based on a refrigerant temperature difference between an inlet and an outlet of the heat exchanger in the bypass.

14. The refrigeration cycle apparatus of claim 9, wherein the amount of the liquid refrigerant in the gas-liquid separator is detected by a liquid surface detector detection unit configured to detect a level of the liquid refrigerant in the gas-liquid separator.

15. The refrigeration cycle apparatus of claim 7, wherein the heater is an electric heater.

16. The refrigeration cycle apparatus of claim 7, wherein the heater is placed at a point corresponding to equal to or higher than 5% and equal to or lower than 50% of an internal effective height of the gas-liquid separator from a lower end of the internal effective height of the gas-liquid separator.

17. The refrigeration cycle apparatus of claim 1, wherein a four-way valve configured to switch a discharged refrigerant flow path between a first heat exchanger side and a second heat exchanger side is provided on a discharge side of the compressor of the main passage.

* * * * *